US012582928B2

(12) United States Patent
Ersando et al.

(10) Patent No.: US 12,582,928 B2
(45) Date of Patent: Mar. 24, 2026

(54) FILTER CARTRIDGE ASSEMBLY

(71) Applicant: ENTEGRIS, INC., Billerica, MA (US)

(72) Inventors: Jean Camille Lu Ersando, Manchester, NH (US); Barry Lee Gregerson, Deephaven, MN (US)

(73) Assignee: ENTEGRIS, INC., Billerica, MA (US)

( * ) Notice: Subject to any disclaimer, the term of this patent is extended or adjusted under 35 U.S.C. 154(b) by 464 days.

(21) Appl. No.: 17/977,762

(22) Filed: Oct. 31, 2022

(65) Prior Publication Data

US 2023/0134445 A1     May 4, 2023

Related U.S. Application Data

(60) Provisional application No. 63/275,725, filed on Nov. 4, 2021.

(51) Int. Cl.
B01D 35/30         (2006.01)
B01D 29/17         (2006.01)

(52) U.S. Cl.
CPC ........... B01D 35/306 (2013.01); B01D 29/17 (2013.01); B01D 2201/29 (2013.01); B01D 2201/4015 (2013.01); B01D 2201/4076 (2013.01)

(58) Field of Classification Search
CPC .. B01D 35/306; B01D 29/17; B01D 2201/29; B01D 2201/4015; B01D 2201/4076; B01D 2201/291; B01D 29/15; B01D 2201/302; B01D 2201/303; B01D 36/001
USPC ....... 210/232, 282, 455, 436, 440–444, 472, 210/453–454, 120, 180, 188
See application file for complete search history.

(56) References Cited

U.S. PATENT DOCUMENTS

| | | | |
|---|---|---|---|
| 7,954,647 B2 | 6/2011 | Hiranaga et al. | |
| 8,268,170 B2 | 9/2012 | Core et al. | |
| 10,646,803 B2 | 5/2020 | Greco et al. | |
| 2001/0037969 A1 | 11/2001 | Stankowski | |
| 2001/0042709 A1 | 11/2001 | Janik | |
| 2005/0040095 A1* | 2/2005 | Stankowski | B01D 29/96 210/232 |
| 2009/0194475 A1 | 8/2009 | Norris et al. | |
| 2010/0155321 A1 | 6/2010 | Sasur et al. | |
| 2012/0037556 A1 | 2/2012 | Beard et al. | |
| 2020/0324230 A1 | 10/2020 | Tucker et al. | |
| 2020/0330915 A1 | 10/2020 | Movia et al. | |

FOREIGN PATENT DOCUMENTS

| | | |
|---|---|---|
| CN | 105939769 A | 9/2016 |
| CN | 108883353 A | 11/2018 |
| CN | 219251821 U | 6/2023 |
| WO | 0222232 A1 | 3/2002 |
| WO | 2006016924 A1 | 2/2006 |
| WO | 2016174777 A1 | 11/2016 |

* cited by examiner

*Primary Examiner* — Madeline Gonzalez

(57)         ABSTRACT

A filter assembly for filtering liquid includes a filter housing and a filter cartridge disposed in an enclosed space of the filter housing. The filter housing including a cap affixed to the bowl to form the enclosed space. The cap including a fluid inlet port, a fluid outlet port, and a gas venting port for the enclosed space. The filter cartridge includes radial projections disposed in slots of the bowl blocking rotation of the filter cartridge relative to the bowl. A method of making a filter assembly includes inserting a filter cartridge into a bowl, and affixing the cap to the bowl.

20 Claims, 8 Drawing Sheets

FILTER CARTRIDGE ASSEMBLY

CROSS-REFERENCE TO RELATED APPLICATIONS

This application claims the benefit under 35 USC 119 of U.S. Provisional Patent Application No. 63/275,725, filed Nov. 4, 2021, the disclosure of which is hereby incorporated herein by reference in its entirety.

FIELD

This disclosure generally relates a filter. More particularly, this disclosure relates to a removable filter cartridge in a filter cartridge assembly.

BACKGROUND

Filters can be employed in semiconductor manufacturing to remove contaminants from a fluid. Fluid (e.g., liquid, water, or the like) is directed through a filter disposed within a housing. The filter can be configured to remove containments such as, for example, solids and other particulates, as the fluid/liquid passes through the filter. In particular, a filter can be used to remove solid containments from a liquid as the liquid passes through the filter.

SUMMARY

In an embodiment, a filter assembly for filtering liquid includes a filter housing and a filter cartridge. The filter housing includes a cap, a bowl, and an enclosed space. A lower circumferential surface of the cap is affixed to an upper circumferential surface of the bowl to form the enclosed space. The cap includes a fluid inlet port, a fluid outlet port, and a gas venting port for the enclosed space. The bowl includes slots disposed on an inner side of the bowl. The filter cartridge is disposed in the enclosed space of the filter housing and is fluidly connected to the fluid inlet port and the fluid outlet port in the cap. The filter cartridge includes radial projections. The radial projections are disposed in the slots of the bowl blocking rotation of the filter cartridge relative to the bowl and preventing a bottom and a side of the filter cartridge from contacting the bowl.

In an embodiment, a method of making a filter assembly for filtering liquid includes inserting a filter cartridge into a bowl. The filter cartridge includes radial projections and the bowl includes slots disposed on an inner side of the bowl. The inserting of the filter cartridge into the bowl inserting each of the radial projections into a respective one of the slots of the bowl. The radial projections inserted in the slots prevents rotation of the filter cartridge relative to the bowl and prevents a bottom and a side of the filter cartridge from contacting the bowl. The method also includes affixing a cap to the bowl to form an enclosed space containing the filter cartridge. The cap includes a fluid inlet port, a fluid outlet port, and a gas venting port. The affixing of the cap to the bowl includes affixing a lower circumferential surface of the cap to an upper circumferential surface of the bowl.

DRAWINGS

Like numbers represent like features.

DETAILED DESCRIPTION

Figure 1:
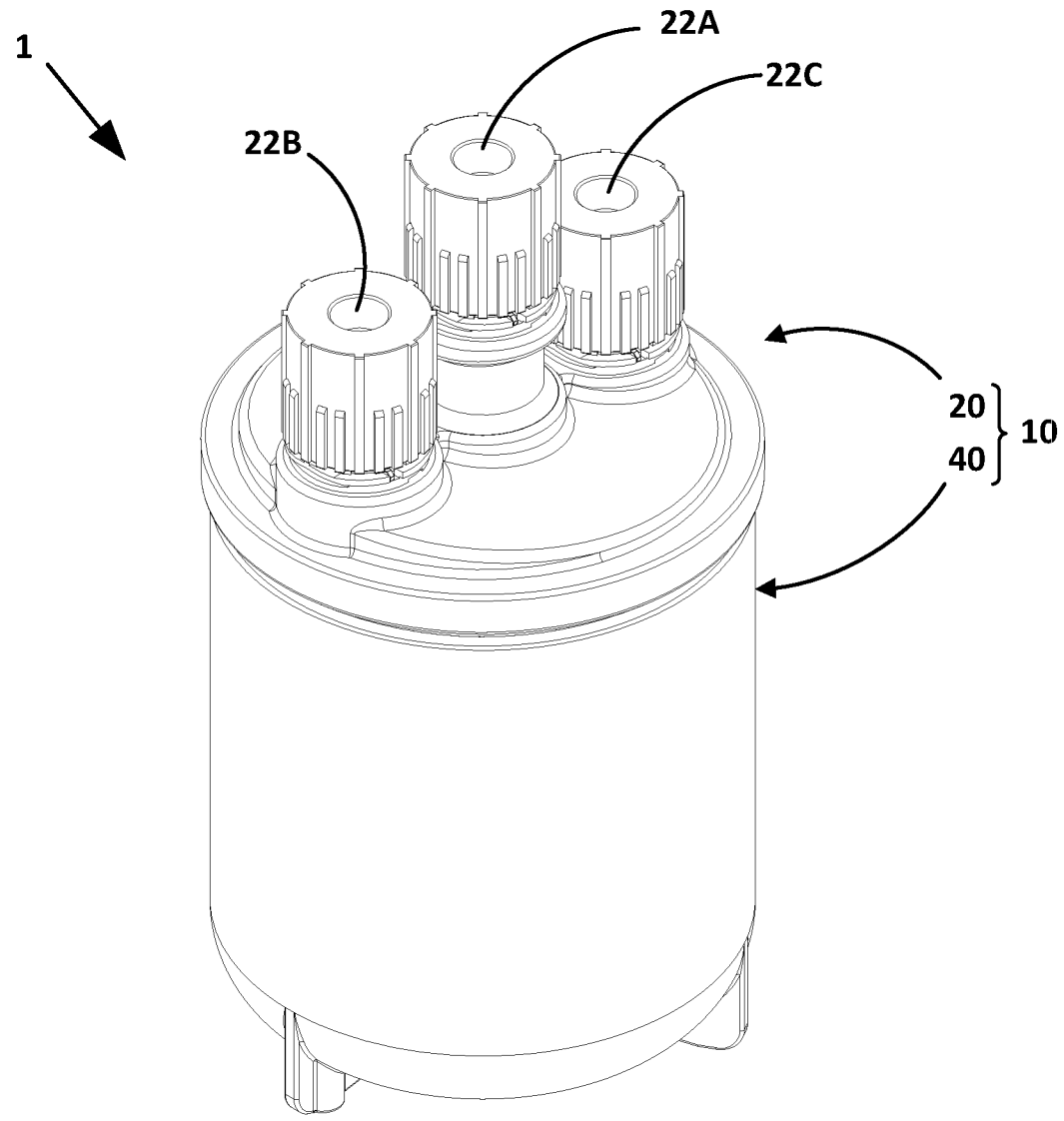
FIG. 1 is a front perspective view of an embodiment of a filter assembly.
Figure 2:
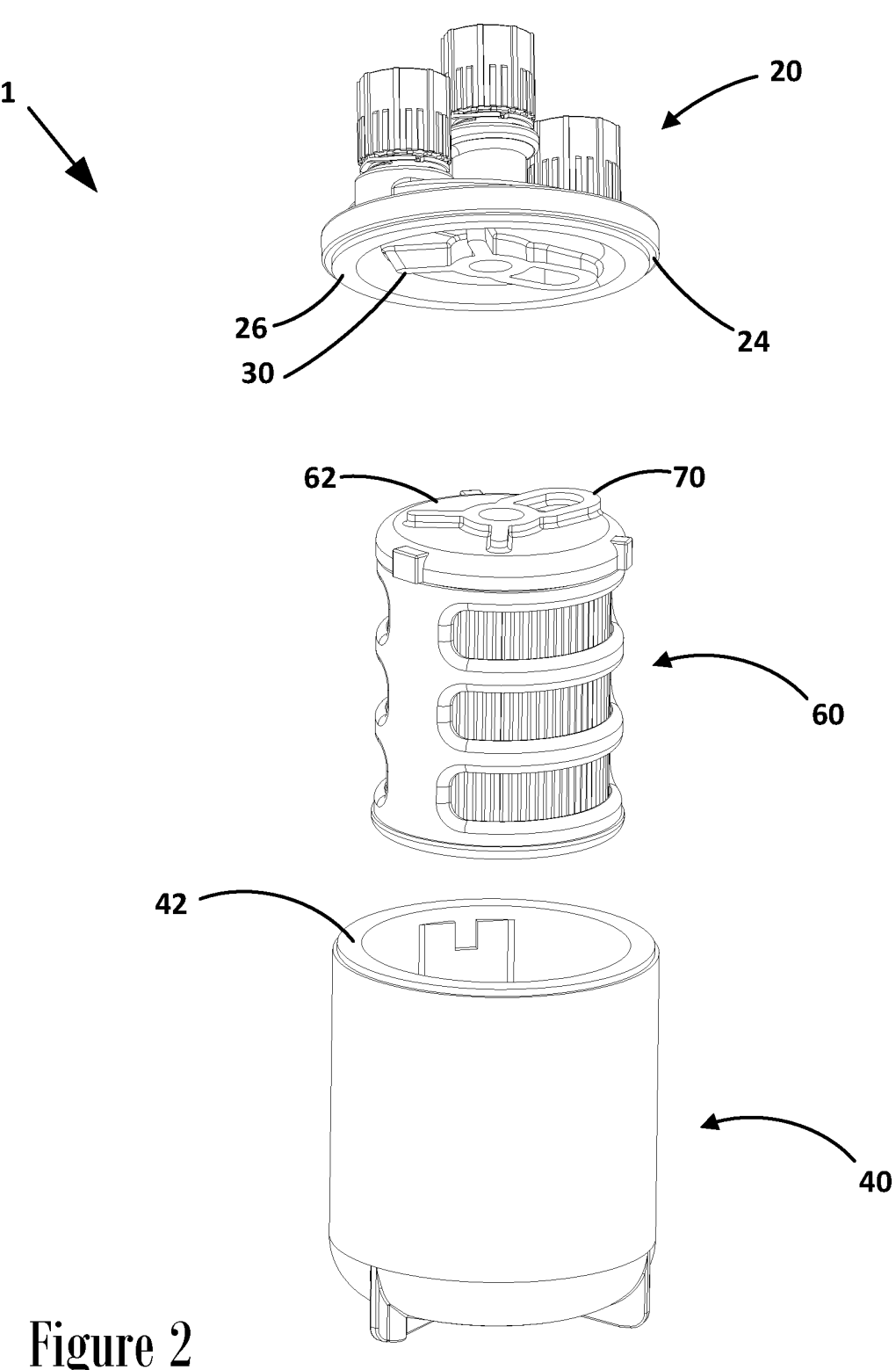
FIG. 2 is an exploded view of the filter assembly of FIG. 1, according to an embodiment.

FIG. 1 is a front perspective view of a filter assembly 1. FIG. 2 is an exploded view of the filter assembly 1. The filter assembly 1 includes a filter housing 10 and a filter cartridge 60 (e.g., shown in FIG. 2) disposed within the enclosed space of the filter housing 10. The filter housing 10 includes a cap 20 and a bowl 40. The filter cartridge 60 is disposed within the filter housing 10. The filter assembly 1 is configured to filter a liquid. For example, the filter assembly 1 is configured to filter a liquid used in semiconductor manufacturing, such as but not limited to, photolithography and wet etch and clean process of semiconductor manufacturing. The filter cartridge 60 is configured to filter contaminants found in the liquid of such semiconductor manufacturing processes (e.g., particulate solids, metal ions, etc.). For example, the liquid may be, but is not limited to, water. In an embodiment, the fluid includes liquid water.

The fluid enters and exits the filter housing 10 through ports 22A, 22B, 22C in the cap 20. The cap 20 includes a pair of fluid ports 22A, 22B and a gas venting port 22C. The fluid ports 22A, 22B are configured to direct the fluid into and out of the filter housing 10. For example, fluid enters the filter assembly 1 through inlet fluid port 22A and the fluid (after being filtered by the filter assembly 1) is discharged from the filter assembly 1 through the fluid outlet port 22B.

The fluid flowing into the housing 10 can also contain gas mixed with the liquid. The gas can be one or more of types of gases that occur in the semiconductor manufacturing processes discussed above (e.g., air bubbles, gaseous byproduct(s), etc.). The fluid contains mostly liquid (e.g., fluid being at least 50% liquid by volume, fluid being at least 90% liquid by volume). The housing 10 is configured to vent gas contained within the housing 10 (e.g., within the enclosed space 12) through the gas venting port 22C. For example, the housing 10 is configured such that gas within the enclosed space 12 is directed to the gas venting port 22C. The gas is then discharged through the gas venting port 22C and prevents buildup of gas within the housing 10.

The filter cartridge 60 is disposed in the bowl 40 and the bottom 24 of the cap 20 is affixed to the top of the bowl 40 and to the top of the filter cartridge 60. In an embodiment, "affixed" and "affixing" as described herein refers to the direct affixing of the two pieces/surfaces to each other. In an embodiment, affixing of two surfaces/pieces is the bonding (e.g., thermal bonding) of the two pieces/surfaces to each other. For example, the surfaces of one or each pieces are/is heated and then the surfaces are contacted to each other to thermally fuse the materials (e.g., polymer, etc.) of the pieces together. The cap 20 is affixed to the bowl 40 to form the enclosed space 12 (e.g., see FIGS. 1 and 7) containing the filter cartridge 60. In particular, a lower circumferential surface 26 on the bottom 24 of the cap 20 is affixed to an upper circumferential surface 42 of the bowl 40. The bottom 24 of cap 20 is also affixed to the top 62 of the filter cartridge 62. In particular, a (first) connection ridge 30 on the bottom 24 of the cap 20 is affixed to a (second) connection ridge 70 on the top 62 of the filter cartridge 62. It should be understood that a circumferential surface is not limited to have a circular shape in an embodiment may be any shape that loops around a circumference (e.g., circular shaped, oval shaped, rectangular shaped, etc.).

Figure 3:
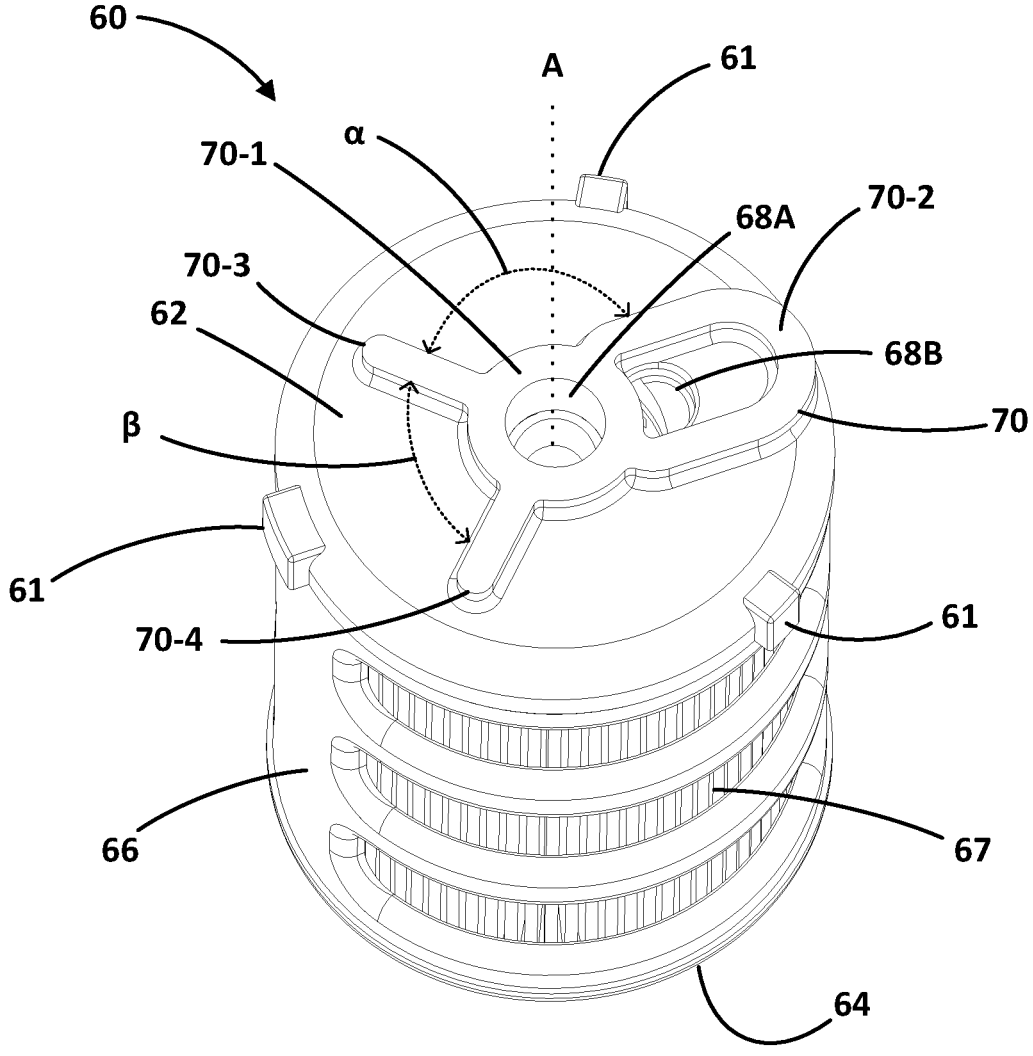
FIG. 3 is a top perspective view of a filter cartridge of a filter assembly, according to an embodiment.

FIG. 3 is a top perspective view of the filter cartridge 60. The filter cartridge 60 has a top 62, a bottom 64 opposite to the top 62, and a side 66. The side 66 extends between the top 62 and the bottom 64 of the filter cartridge 60 (e.g., extend from the top 62 to the bottom 64 of the cap). The filter cartridge 60 includes a cartridge inlet 68A and a cartridge outlet 68B in the top 62. In an embodiment, the side 66 of the filter cartridge 60 includes a filter material 67. In an embodiment, fluid/liquid is filtered by the filter cartridge 60 by passing through the filter material 67 into the filter cartridge 60. The filtered fluid/liquid then flows out of the filter cartridge 60 through the cartridge outlet 68B. The cartridge inlet 68A and the cartridge outlet 68B are discussed in more detail below. As shown in FIG. 3, the filter cartridge 10 has a cylindrical shape with a vertical axis A. In the illustrated embodiment, the cartridge inlet 68A is disposed along the vertical axis A of filter cartridge 10.

Figure 7:
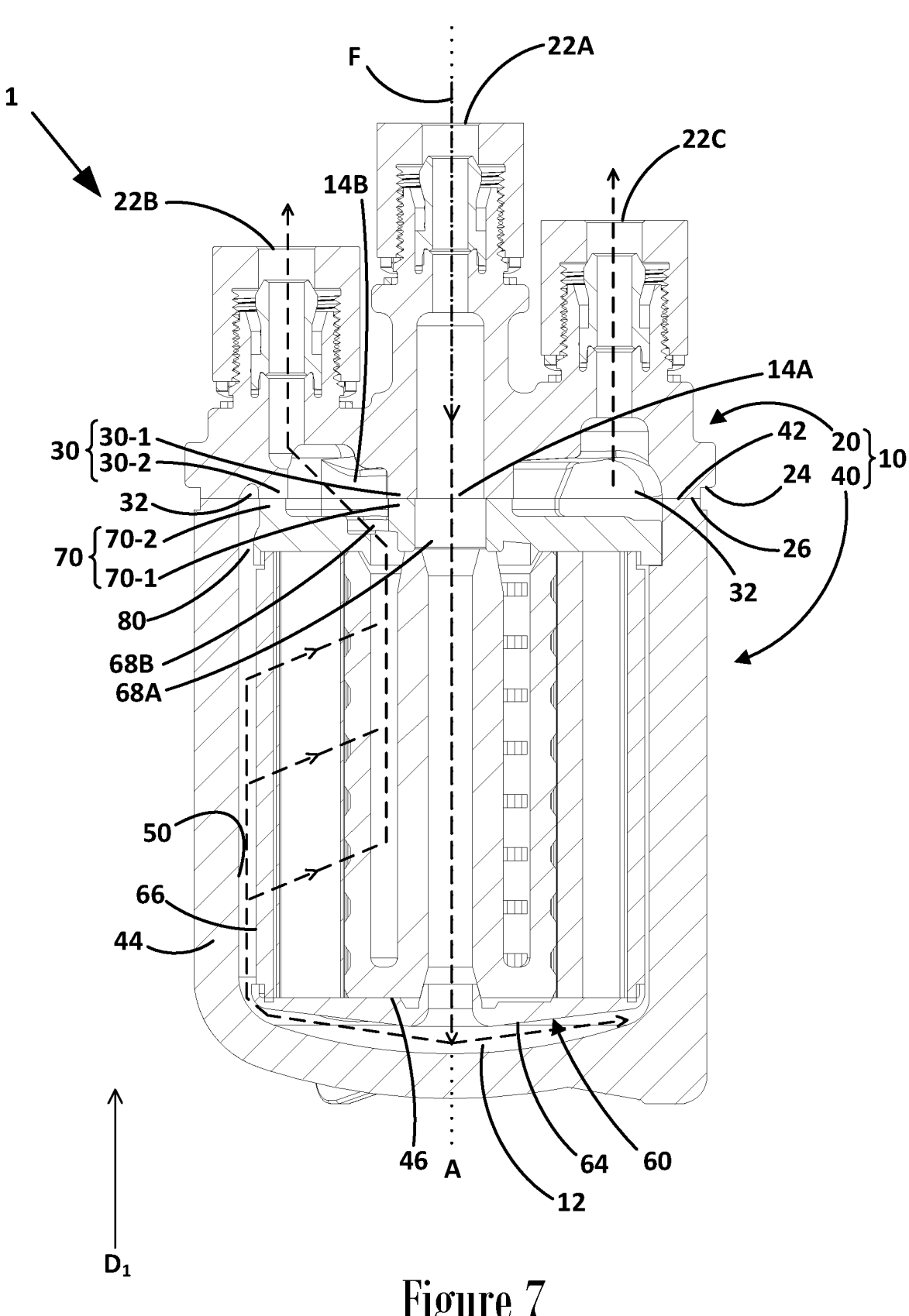
FIG. 7 is a vertical cross sectional view of the filter assembly of FIG. 1, according to an embodiment.

The top 62 of the filter cartridge 60 also includes a connection ridge 70 that extends from the top 62 of the filter cartridge 60 (e.g., extends upward from the top surface). The connection ridge 70 individually surrounds each of the cartridge inlet 68A and the cartridge outlet 68B (e.g., surrounds the opening of the cartridge inlet 68A provided in the top 62, surrounds the opening of the cartridge outlet 68B in the top 62). In the filter cartridge assembly (e.g., as shown in FIG. 1 and FIG. 7), the connection ridge 70 of the filter cartridge 60 is affixed to (e.g., bonded to) the bottom 24 of the cap 20. For example, the connection ridge 70 of the filter cartridge 60 may be affixed to (e.g., bonded to) a connection ridge 30 on the bottom 24 of the cap 20, as discussed below.

The connection ridge 70 of the filter cartridge 60 includes a first portion 70-1 and a second portion 70-2. The second portion 70-2 can extend from the first portion 70-1 as shown in FIG. 3. The first portion 70-1 surrounds the cartridge inlet 68A and the second portion 70-2 surrounds the cartridge outlet 66. For example, the first portion 70-1 surrounds the cartridge inlet 68A without surrounding the cartridge outlet 68B, and the second portion 70-2 surrounds the cartridge outlet 68B without surrounding the cartridge inlet 68A.

The connection ridge 70 can also include a third portion 70-3 and a fourth portion 70-4 that each extend from the first portion 70-1. Each of the second portion 70-1, the third portion 70-3, and the fourth portion 70-4 extends from the first portion 70-1 in a different direction (e.g., in a different radial direction). The respective angle (e.g., angle α, angle β, etc.) between each adjacent pair of the portions 70-2, 70-3, 70-4 extending from the first portion 70-1 is at least 30 degrees. In an embodiment, the angle between each adjacent pair of the portions 70-2, 70-3, 70-4 extending from the first portion 70-1 may be at least 60 degrees. In an embodiment, the angle between each adjacent pair of the portions 70-2, 70-3, 70-4 extending from the first portion 70-1 may be at least 100 degrees. The two additional portions 70-3, 70-3 can help ensure that contact of the cap 20 on the connection ridge 70 is more centered (e.g., helps equalize the downward force across the top 62 of the cartridge 60, helps minimize horizontal force on the cap 20 when the cap 20 is pushed down onto the cartridge).

In the illustrated embodiment, the connection ridges 30, 70 have four portions that extend from a first portion. It should be appreciated that the connection ridges 30, 70 may include a different number of portions than four in other embodiments. In an embodiment, the connection ridges 30, 70 may have just first and second portions. In an embodiment, the connection ridges may include the first and second portions and then one or more additional portions extending from the first portion or the second portion. In an embodiment, the connection ridges may include more than four portions (e.g., the first portion, the second portion, and two or more portions extending from the first portion and/or the second portion).

As shown in FIG. 3, the connection ridge 70 has a flat upper surface (e.g., along a single horizontal plane). In an embodiment, the upper surface of the connection ridge 70 may be made of multiple flat upper surfaces. For example, the upper surface of the first portion 70-1 in an embodiment may be along be a flat surface along a different horizontal plane than the flat upper surface of the second portion 70-2.

Figure 4:
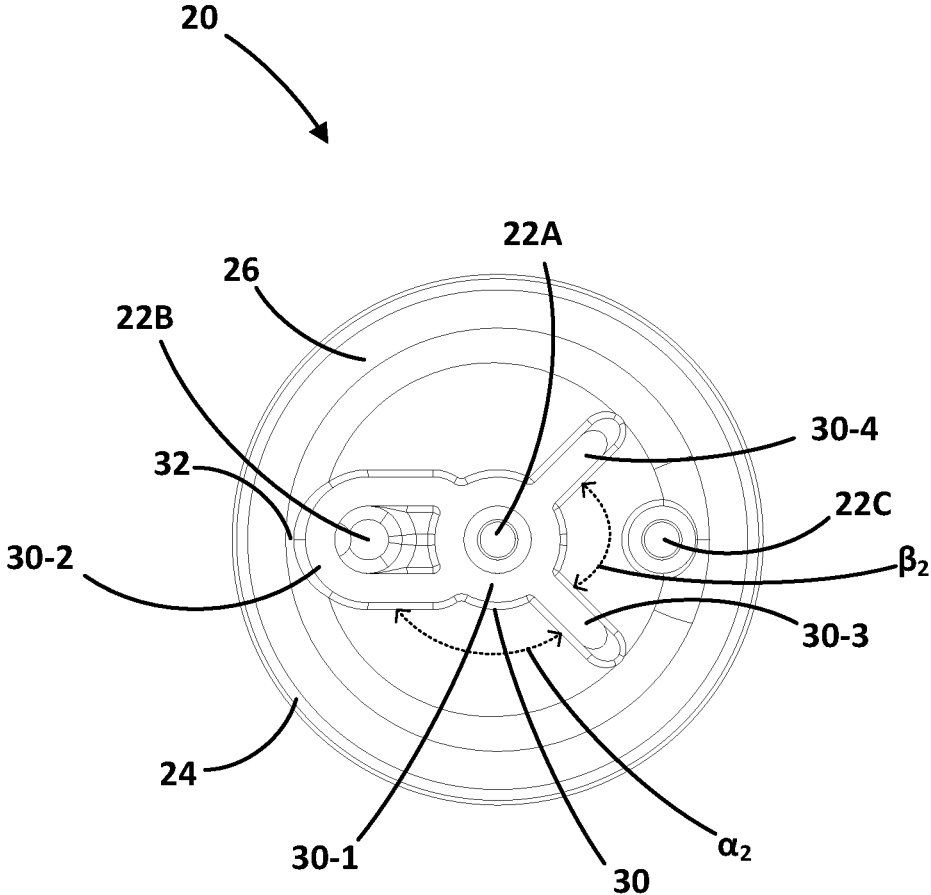
FIG. 4 is a bottom view of a cover of a filter assembly, accordingly to an embodiment.

FIG. 4 is a bottom view of the cap 20 of the filter assembly 1. The cap 20 has a bottom 24 that is affixed (e.g., bonded) to the bowl 40 and the filter cartridge 60. The ports 22A, 22B, 22C extend through the cap 20 to the bottom 24 of the cap 20. The bottom 24 of the cap 20 includes the lower circumferential surface 26 and the connection ridge 30. The lower circumferential surface 26 integrally connects the cap 20 to the bowl 40. The connection ridge 30 integrally connects the cap 20 to the filter cartridge 60.

The connection ridge 30 extends from the bottom 24 of cap 20 (e.g., extends downward from a bottom surface of the cap 20). The connection ridge 30 individually surrounds each of the fluid inlet port 22A and the fluid outlet port 22B. The connection ridge 30 surrounds the opening of the fluid inlet port 22A in the bottom 24 and surrounds the opening of the fluid outlet port 22B in the top 24.

The connection ridge 30 of the cap 20 includes a first portion 30-1 and a second portion 30-2. The second portion 30-2 can extend from the first portion 30-1 (e.g., extends away from the first portion 30-1 on the bottom 24 of the cap 20, extends away from the first portion 30-1 in a radial direction, as shown in FIG. 4. The first portion 30-1 surrounds the fluid inlet port 22A and the second portion 30-2 surrounds the fluid outlet port 22B. For example, the first portion 30-1 surrounds the fluid inlet port 22A without surrounding the fluid outlet port 22B, and the second portion 30-2 surrounds the fluid outlet port 22A without surrounding the fluid inlet port 22A. The connection ridge 30 is configured to not surround the gas venting port 22C (e.g., does not surround the opening in the bottom 24 of the cap 20 for the gas venting port 22C).

The connection ridge 30 can also include a third portion 30-3 and a fourth portion 30-4 that each extend from the first portion 30-1. Each of the second portion 30-1, the third portion 30-3, and the fourth portion 30-4 extends from the first portion 30-1 in a different direction (e.g., in a different radial direction). The respective angle (e.g., angle $\alpha_2$, angle $\beta_2$, etc.) between each adjacent pair of the portions 30-2, 30-3, 30-4 extending from the first portion 30-1 is at least 30 degrees. In an embodiment, the angle between each adjacent pair of the portions 30-2, 30-3, 30-4 extending from the first portion 30-1 may be at least 60 degrees. In an embodiment, the angle between each adjacent pair of the portions 30-2, 30-3, 30-4 extending from the first portion 30-1 may be at least 100 degrees. The two additional portions 30-3, 30-3 can help center the contact of the cap 20 on the top 62 of the filter cartridge 60 (e.g., helps equalize the downward force across the top 62 of the cartridge 60, helps minimize horizontal force on the cap 20 when the cap 20 is pushed down onto the cartridge).

As shown in the illustrated embodiment, the lower circumferential surface 26 of cap 20 is spaced apart from the connection ridge 30 of the cap 20. In particular, the lower circumferential surface 26 is radially spaced apart from the connection ridge 30. For example, a circumferential groove 32 is provided in the bottom 24 of the cap 20 that separates the connection ridge 30 from the lower circumferential surface 26 of cap 20. The bottom 24 of the cap and the groove 32 are shaped to direct gas from the fluid to the gas venting port 22C.

In the filter cartridge assembly (e.g., as shown in FIG. 1 and FIG. 7), the connection ridge 30 of the cap 20 is affixed (e.g., bonded) to the connection ridge 70 on the top 62 of the filter cartridge 60. Each portions 30-1, 30-2, 30-3, 30-4 of the ridge 30 of the cap 20 is affixed (e.g., bonded) to a corresponding portion 70-1, 70-2, 70-3, 70-4 of the ridge 70 of the filter cartridge 60. For example, the first portion 30-1 of the ridge 30 of the cap 20 is affixed (e.g., bonded) to the first portion 70-1 of the ridge 70 of the filter cartridge 60, and the second portion 30-2 of the ridge 30 of the cap 20 is affixed (e.g., bonded) to the second portion 70-2 of the connection ridge 70 of the filter cartridge 60. For example, the third portion 30-3 of the ridge 30 of the cap 20 is affixed (e.g., bonded) to the third portion 70-3 of the ridge 70 of the filter cartridge 60, and the fourth portion 30-2 of the ridge 30 of the cap 20 is affixed (e.g., bonded) to the second portion 70-2 of the ridge 70 of the filter cartridge 60.

As shown in FIG. 4, the connection ridge 30 has a flat lower surface (e.g., flat along a horizontal plane). In an embodiment, the connection ridge 30 may have multiple flat upper surfaces. For example, the flat lower surface of the first portion 30-1 in an embodiment may be along a different horizontal plane than the horizontal plane for the flat lower surface of the second portion 30-2.

Figure 5:
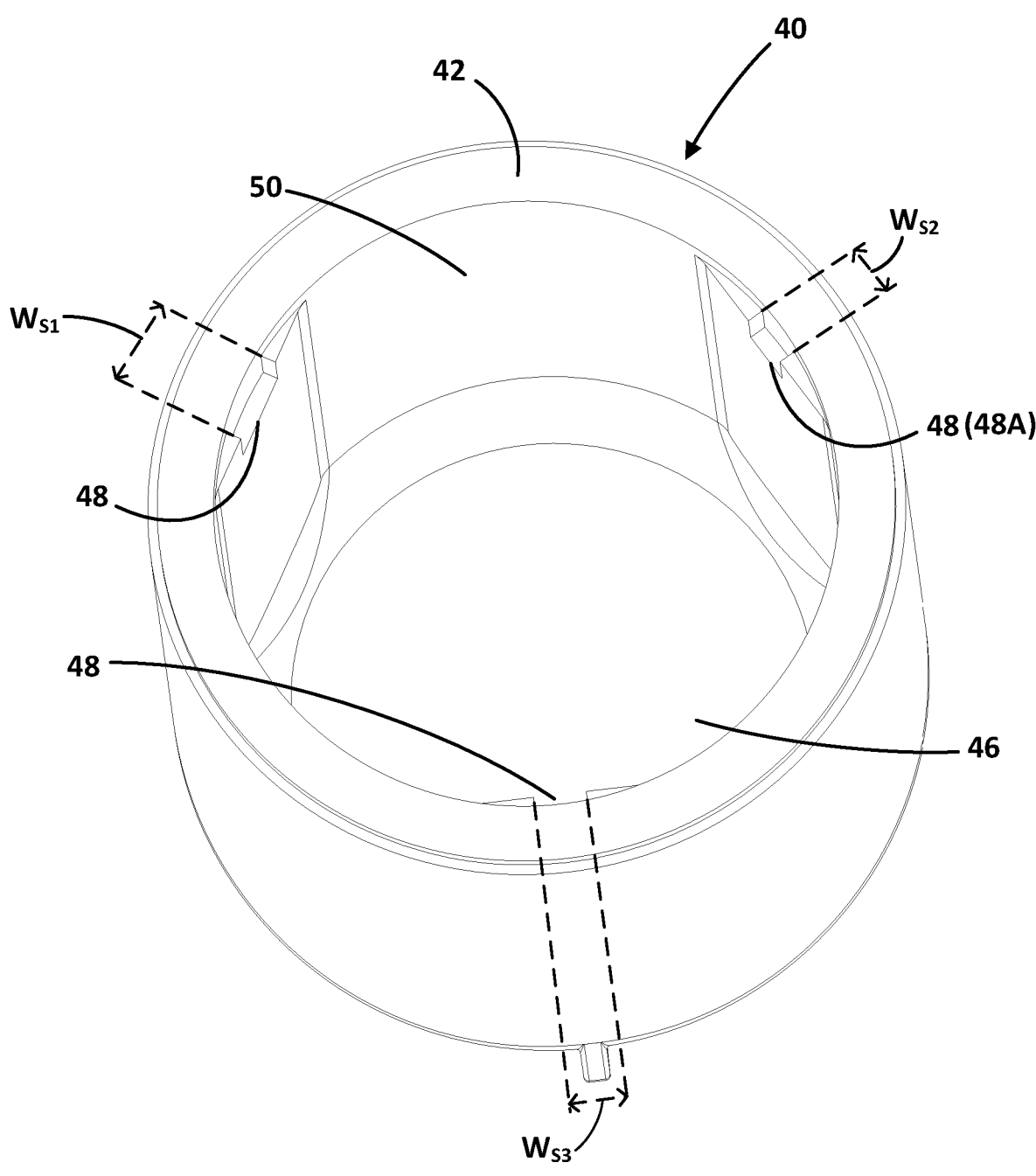
FIG. 5 is a top perspective view of a bowl of a filter assembly, according to an embodiment.

FIG. 5 shows a top perspective view of the bowl 40 of the filter assembly 1. The bowl 40 includes a sidewall 44 and a bottom 46. The sidewall 44 includes the upper circumferential surface 42 of the bowl 40 to which the cap 20 is affixed (e.g., bonded). The bowl 40 includes slots 48 disposed on an inner side 50 of the bowl 40. One of the slots 48 is illustrated in dotted lines in FIG. 5 as said slot is obscured in the view of FIG. 5. The bowl 40 includes a slot 48 for each of the radial projections 61 of the filter cartridge 60. The slots 48 each extend in the vertical direction. Each of the slots 48 has a respective width $W_{S1}$, $W_{S2}$, $W_{S3}$. The width of each slot 48 measured in the circumferential direction of the bowl 40. In an embodiment, one of the slots 48A has a smaller width $W_{S2}$ than the other slots 48 such that only the corresponding radial projection will fit into said slot 48A. For example, this can ensure that only correct radial projection 61 fits in the slot 48A and that the filter cartridge 60 is inserted into the bowl 40 in the correct orientation (e.g., filter cartridge 60 is not in a rotated).

Figure 6:
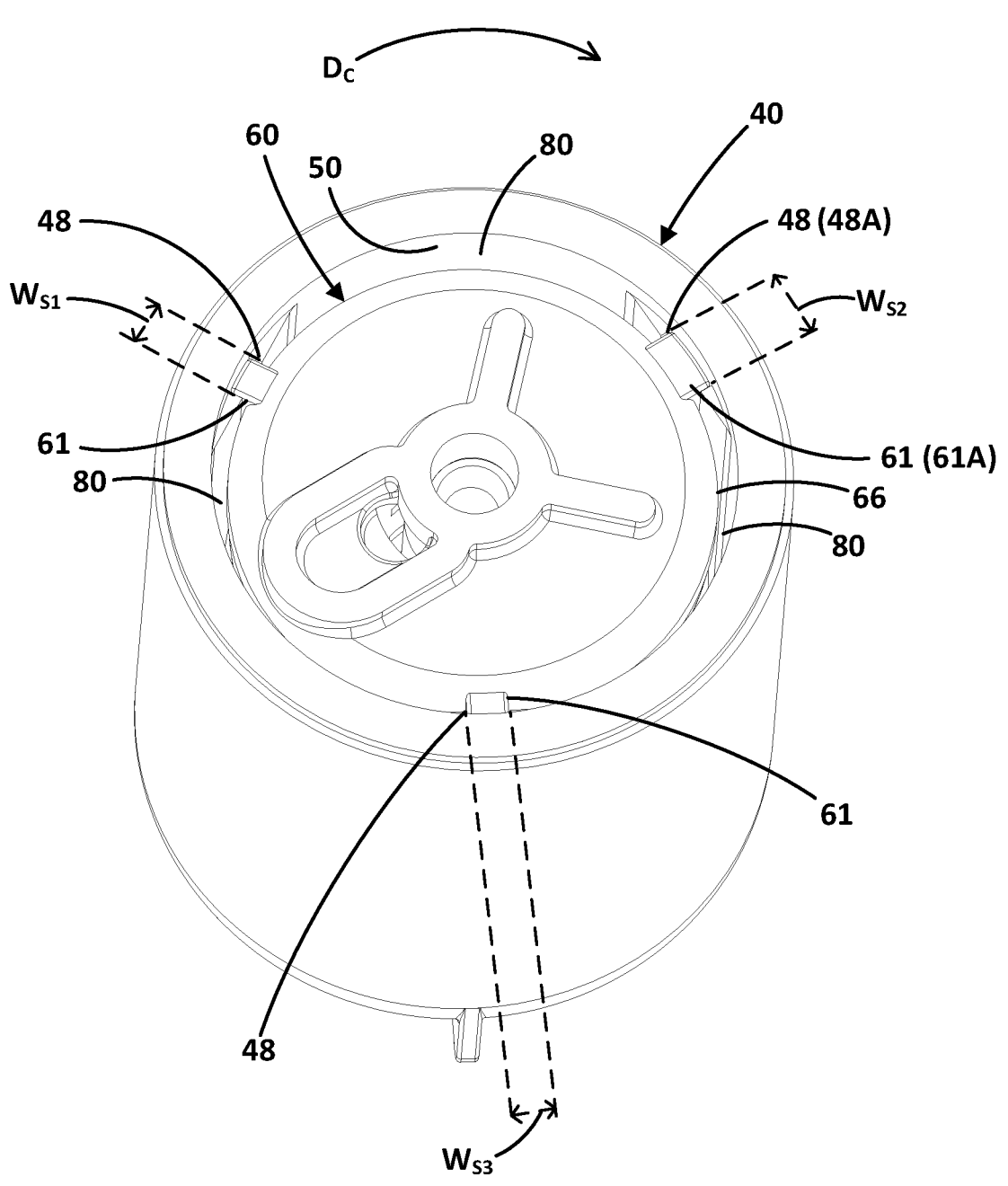
FIG. 6 is a top view of a filter cartridge in a bowl of a filter assembly, according to an embodiment.

FIG. 6 is a top view of the filter cartridge 60 disposed in the bowl 40, according to an embodiment. For example, FIG. 5 illustrates a top view of the filter assembly 1 with the cap 20 omitted. The filter cartridge 60 is disposed in the bowl 40 by inserting each of the radial projections 61 into a respective one of the slots 48 in the bowl 40. Each radial projection 61 is disposed in a different one of the slots 48. For example, the filter cartridge 60 can be configured to hang within the bowl 40 by the radial projections 61 (e.g., see FIG. 7). For each radial projection 61, the radial projection 61 and its respective slot 48 have the corresponding widths $W_{S1}$, $W_{S2}$, $W_{S3}$ such that the radial projection 61 is prevented from moving circumferentially within its respective slot 48 (e.g., rotating circumferential direction Dc). For example, each radial projection 61 and its respective slot 48 have at or about the same width $W_{S1}$, $W_{S2}$, $W_{S3}$ (e.g., the same width with a minor tolerance that allows for the radial projection 61 to be lifted out of slot 48 while preventing radial movement of the radial projection within its slot 48). The radial projections 61 are disposed in the slots 48 such that the filter cartridge 60 is blocked from rotating relative to the bowl 40. In the illustrated embodiment, the filter cartridge 60 is configured to be inserted into the bowl 40 without rotating in the circumferential direction Dc.

As shown in FIG. 6, one of the slots 48A has a smaller width $W_{S2}$ than the other slots 48. The corresponding radial projection 61A for the slot 48A also has a smaller width than the other radial projections 61A. The smaller width $W_{S2}$ of the slot 48A prevents the non-corresponding radial projections 61 (e.g. the projections 61 other than the corresponding projection 61A) from being inserted into the will fit into said slot 48A. For example, this can ensure that only correct radial projection 61 fits in the slot 48A and that the filter cartridge 60 is inserted into the bowl 40 in a predetermined orientation (e.g., filter cartridge 60 is inserted in a desired orientation).

The side 66 of the filter cartridge 60 is spaced radially apart from the inner side 50 of the bowl 40 by the radial projections 61. The radial spacing forms one or more vent passageways 80. The vent passageways 80 are defined by the side 66 of the filter cartridge 60, the inner side 50 of the bowl 40, and the radial projections 61. Each vent passageway 80 is located between a respective circumferential adjacent pair of the radial projections 61. The vent passageways 80 are configured to direct gas within the filter assembly 1 to the gas venting port 22C in the cap 20.

In the illustrated embodiment, the filter cartridge 60 includes three radial projections 62 and the bowl 40 includes three slots 48. However, it should be appreciated that the filter assembly 1 may include a different number of radial projections 62 and/or slots 48 in other embodiments. In an embodiment, the filter cartridge 60 may include two or more of the radial projections 62. In an embodiment, the bowl 40 may include two or more of the slots 48. In an embodiment, the filter cartridge may include at least three of the radial projections 62 and the bowl may include at least three of the slots 48.

FIG. 7 is a vertical cross sectional view of the filter assembly 1. As shown in FIG. 7, the affixed cap 20 and bowl 40 form the enclosed space 12 of the housing 10 containing the filter cartridge 60. The cap 20 includes the fluid inlet port 22A, the fluid outlet port 22B, and the gas venting port 22C for the enclosed space 12. For example, the enclosed space 12 is enclosed except for the ports 22A, 22B, 22C in cap 20.

The filter cartridge 60 is disposed in the enclosed space 12 of the housing 10. Each radial projection 61 of the filter cartridge 60 is disposed in a respective one of the slots 48 of the bowl 40. For example, the radial projections 61 disposed in the slots 48 such that the filter cartridge 60 hangs within the bowl 40. The radial projections 61 disposed in the slots 48 such that the side 66 and the bottom 64 of the filter cartridge 60 are prevented from contacting the bowl (e.g., do not contact the bottom 46 and/or the inner side 50 of the bowl 40, the side 66 of the filter cartridge is spaced apart from the sidewall 44 of the bowl 40 and the bottom 64 of the filter cartridge 60 is spaced apart from the bottom 46 of the bowl 40). For example, the filter assembly 1 in an embodiment is configured to limit all contact between the filter cartridge 60 and the bowl 40 to be via the radial projections 61 and the slots 48 (e.g., all contact is the radial projections 61 contacting the slots 48). In an embodiment, "contact" as described herein is "direct contact".

The general flow path F of the fluid through the filter assembly 1 and the housing is shown in dashed arrows in FIG. 7. Specifically, the flow path F is illustrated for the flow of liquid through the filter assembly 1. The fluid F enters the housing 10 through the fluid inlet port 22A in the cap 20, passes through the filter cartridge 60, and then the fluid (e.g., the filtered fluid) exits the housing 10 through the fluid discharge port 22B. The connection ridge 30 of the cap 20 is affixed to the connection ridge 70 of the filter cartridge 60. In an embodiment, all contact of the contact of the filter cartridge 60 with the cap 20 is via its connection ridge 70. For example, all contact between the filter cartridge 60 and the cap 20 is via the connection ridges 30, 70 (e.g., all contact is the connection ridge 30 of the cap 20 contacting the connection ridge 70 of the filter cartridge 60). The first portion 30-1 of the connection ridge 30 of the cap 20 is affixed to the first portion 30-1 of the connection ridge 70 of filter cartridge 60. The second portion 30-2 of the connection ridge 30 of the cap 20 is affixed to the second portion 30-2 of the connection ridge 70 of filter cartridge 60. As shown in FIG. 3, the ports 22A, 22B, 22C each extend through the cap 20 to the bottom 24 of the cap 20.

As shown in FIG. 7, the connection ridges 30, 70 form an intermediate inlet passageway 14A and an intermediate outlet passageway 14B which fluidly connect the fluid inlet port 22A and the fluid discharge port 22B in the cap 20 to the filter cartridge 60. The affixed first portions 30-1, 70-1 of the cap 20 and the filter cartridge 60 form the intermediate inlet passageway 14A. The intermediate inlet passageway 14A fluidly connects the fluid inlet port 22A of the cap 20 to the cartridge inlet 68A of the filter cartridge 60. The intermediate inlet passageway 14A directs fluid supplied to the filter assembly 1 through the fluid inlet port 22 (e.g., the fluid to be filtered) from the fluid inlet port 22A to the cartridge inlet 68A. The intermediate inlet passageway 14A is a sealed fluid connection from the fluid inlet port 22A to the cartridge inlet 68A (e.g., the intermediate inlet passageway 14A directly connects the opening in the bottom 24 of cap 20 for the fluid inlet port 22A to the opening in the top 61 of the filter cartridge 60 for the cartridge inlet 68A).

The intermediate outlet passageway 14B fluidly connects the cartridge outlet 68B of the filter cartridge 60 to the fluid outlet port 22B in the cap 20. The intermediate outlet passageway 14B directs the filtered fluid discharged from the cartridge inlet 68A of the filter cartridge 60 (e.g., the fluid after passing through and being filtered by the filter cartridge 60) to the fluid outlet port 22B of the cap 20. The intermediate outlet passageway 14B is a sealed fluid connection from the cartridge outlet 68B to the fluid outlet port 22B (e.g., the intermediate outlet passageway 14B directly connects the opening in the top 61 of the filter cartridge 60 for the cartridge outlet 68B to the opening in the bottom of cap 20 for the fluid outlet port 22B). The filtered fluid is discharged from the filter assembly 1 through the fluid outlet port 22B.

As shown in FIG. 7, the cartridge inlet 68A and the fluid inlet port 14A are disposed along the vertical axis A of the filter cartridge 60. The cartridge inlet 68A and the fluid inlet port 14B each extend along the vertical axis A (e.g., extending parallel to the vertical axis A and overlapping the vertical axis A). It should be appreciated that the positions of the fluid inlet port 14B and the fluid outlet port 14B in the cap 20 may be different in other embodiments based on the configuration of the filter cartridge 60. In an embodiment, the positions of the fluid inlet port 14B and the fluid outlet port 14B in the cap 20 may be inversed (e.g., the fluid outlet port 14 being along the vertical axis A of the filter cartridge 60). For example, in such an embodiment, the filter cartridge 60 may not include the filter cartridge inlet 68A. For example, the filter inlet port 14A may be configured to directly supply the fluid to the space between along the side 66 of the filter cartridge 60 without having to pass through the filter cartridge 60. The fluid then in said space then being filtered by flowing through the side 66 of the filter cartridge 60 into the cartridge.

In the illustrated embodiment, the cartridge inlet 68A is an open passageway that extends through the filter cartridge 60. The fluid flows through the cartridge inlet 68A and out through an opening in the bottom 64 of the filter cartridge 60. The fluid flows from the cartridge inlet 68A into the space between the bottom 64 of filter cartridge 60 and the bottom 46 of the bowl 40, radially outward to the inner side 50 of the bowl, and then upwardly in the space along the side 66 of the filter cartridge 60 (e.g., between the side 66 of the filter cartridge 60 and the inner side 50 of the sidewall 44 of the bowl 40). The fluid flows radially inwardly through the side 66 of the filter cartridge 66 (e.g., a filter material forming the side of the filter cartridge 66). The fluid is filtered as it passes through the material of the side 66 of the filter cartridge 66. The filtered fluid then flows upwardly within the filter cartridge 60 to the cartridge inlet 68B.

In FIG. 7, the lower circumferential surface 26 of the cap 20 is affixed to the upper circumferential surface 42 of the bowl 40. The lower circumferential surface 26 and the connection ridge 30 are spaced apart from each other on the bottom 24 of the cap 20. For example, the lower circumferential surface 26 and the connection ridge 30 are spaced apart in the radial direction by the groove 32. The lower circumferential surface 22 is spaced apart from the first part 30-1 and the second part 30-2 of the connection ridge 30 in the radial direction by the open space of the groove 32.

One or more vent passageways 80 are formed between the inner side 50 of the bowl 40 and the side 66 of the filter cartridge 60. Each vent passageway 80 extends vertically upward (e.g., in direction D1) between a respective adjacent pair of the radial projections 62 (e.g., shown in FIG. 6). The vent passageway(s) 80 are configured to direct gas within the enclosed space 12 (e.g., bubbles from the liquid supplied to the filter assembly 1) to the gas venting port 22C in the cap 20. For example, the vent passageway(s) 80 is configured to direct gas in the fluid flowing vertically upward along the side 66 of the filter cartridge 60 (e.g., in the space between the inner side 50 of the bowl 40 and the side 66 of the filter cartridge 60) towards the bottom 24 of the cap 20. For example, the vent passageway(s) 80 direct the gas into the groove 32 which funnels into the opening in the cap 20 for the gas venting port 22C.

Figure 8:
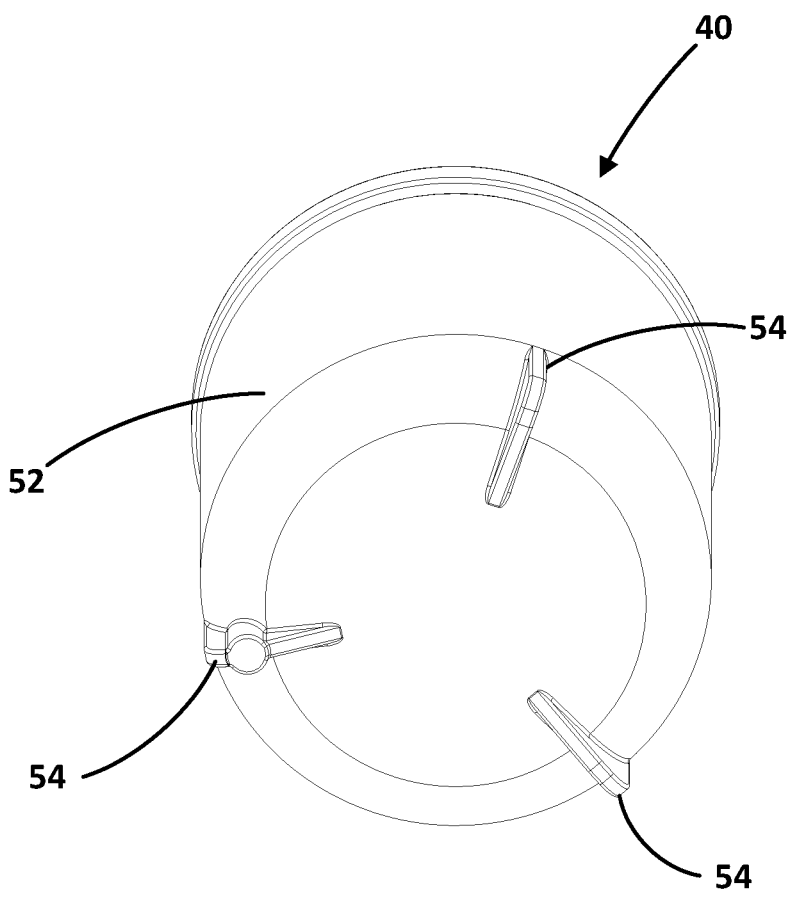
FIG. 8 is a bottom perspective view of a filter bowl, according to an embodiment.

FIG. 8 is a bottom view of the bowl 40 of the filter assembly 1. As shown in FIG. 8, the bowl 40 includes an exterior surface 52 with a plurality of protuberances 54. In an embodiment, the bowl 40 may include one or more of the protuberances 54. The protuberance(s) 54 are configured to provide an external keying feature that indicates an orientation of the filter assembly 1. In an embodiment, the bowl 40 may include one or more of the protuberances 54.

In an embodiment, a method of making a filter assembly (e.g., filter assembly 1) includes inserting a filter cartridge (e.g., filter cartridge 60) into a bowl (e.g., bowl 40) and affixing a cap (e.g., cap 20) to the bowl to form an enclosed space (e.g., enclosed space 12) containing the filter cartridge. Inserting the filter cartridge into the bowl can include inserting each radial projection (e.g., radial projection 61) into a respective slot (e.g., slot 48).

Affixing the cap to the bowl can include affixing a lower circumferential surface of the cap (e.g., lower circumferential surface 22) against an upper circumferential surface 42 of the bowl. In an embodiment, affixing the cap to the bowl includes affixing (e.g., bonding) a connection ridge on the bottom of the cap (e.g., 30) to a connection ridge on the top of the filter cartridge (e.g., connection ridge 70).

In an embodiment, affixing as discussed herein refers to thermal bonding. The thermal bonding thermally fuses the cap to the bowl. The bonding thermally fuses the polymer material of the cap with the polymer material of the bowl and/or the polymer material of the filter cartridge. Thermal bonding can also be referred to as fusion bonding. In an embodiment, the lower circumferential surface of the cap is thermally bonded to the upper circumferential surface of the bowl. In an embodiment, the thermal bonding may be performed by heating one or more of the upper circumferential surface and the lower circumferential surface and then placing the surfaces against each other. In an embodiment, the bonding may be via ultrasonic bonding.

ASPECTS

Any of Aspects 1-15 can be combined with any of Aspects 16-18.

Aspect 1. A filter assembly for filtering liquid, comprising: a filter housing including a cap, a bowl, and an enclosed space, a lower circumferential surface of the cap affixed to an upper circumferential surface of the bowl to form the enclosed space, the cap including a fluid inlet port, a fluid outlet port, and a gas venting port for the enclosed space, and the bowl including slots disposed on an inner side of the bowl; and a filter cartridge disposed in the enclosed space of the filter housing and fluidly connected to the fluid inlet port and the fluid outlet port in the cap, and the filter cartridge including radial projections disposed in the slots of the bowl blocking rotation of the filter cartridge relative to the bowl and preventing a bottom and a side of the filter cartridge from contacting the bowl.

Aspect 2. The filter assembly of Aspect 1, wherein all contact between the cap and the bowl and between the cap and the filter cartridge is via flat surfaces of the cap, the bowl, and the filter cartridge.

Aspect 3. The filter assembly of any one of Aspects 1 and 2, wherein a bottom of the cap is pressed against a top of the filter cartridge preventing vertical movement of the filter cartridge in the enclosed space, and each of the radial projections is inserted into a respective one of the slots, each of the radial projections and the respective one of the slots have a same width that prevents circumferential movement of each of the radial projections within each of the slots.

Aspect 4. The filter assembly of any one of Aspects 1-3, wherein all contact between the filter cartridge and the bowl is via the radial projections and the slots.

Aspect 5. The filter assembly of any one of Aspects 1-4, wherein the cap includes a first connection ridge that extends from a bottom of the cap and surrounds each of the fluid inlet port and the fluid outlet port in the cap, and the filter cartridge includes a top with a cartridge inlet, a cartridge outlet, and a second connection ridge that extends from the top of the filter cartridge and surrounds each of the cartridge inlet and the cartridge outlet in the filter cartridge, and the first connection ridge of the cap being affixed to the second connection ridge of the filter cartridge.

Aspect 6. The filter assembly of Aspect 5, wherein all contact between the filter cartridge and the cap is via the first connection ridge and the second connection ridge.

Aspect 7. The filter assembly of any one of Aspects 5 or 6, wherein the first connection ridge is affixed to the second connection ridge to form each of: an intermediate inlet passageway that is a sealed fluid connection from the fluid inlet port of the cap to the cartridge inlet of the filter cartridge, and an intermediate outlet passageway that is a sealed fluid connection from the cartridge outlet of the filter cartridge to the fluid outlet port of the cap.

Aspect 8. The filter assembly of any one of Aspects 5-7, wherein the second connection ridge includes: a first ridge portion that surrounds the cartridge inlet, and a second ridge that extends from the first ridge portion and surrounds the cartridge outlet.

Aspect 9. The filter assembly of Aspect 8, wherein the second connection ridge includes a third ridge portion and a fourth ridge portion, and each of the second ridge portion, the third ridge portion, and the fourth ridge portion extends outward from the first portion in a different radial direction.

Aspect 10. The filter assembly of any one of Aspects 5-9, wherein the filter cartridge has a cylindrical shape, the cartridge inlet and the fluid inlet port disposed along a vertical axis of the cylindrical shape of the filter cartridge.

Aspect 11. The filter cartridge of any one of Aspects 5-10, wherein the first connection ridge and the second connection ridge have a same shape.

Aspect 12. The filter cartridge of any one of Aspects 5-11, wherein the lower circumferential surface is spaced apart from the first connection ridge of the cap.

Aspect 13. The filter cartridge of any one of Aspects 1-12, wherein the side of the filter cartridge is radially spaced apart from the inner side of the bowl by the radial projections to form one or more vent passageways configured to direct gas within the enclosed space to the gas venting port in the cap.

Aspect 14. The filter cartridge of Aspect 13, wherein the one or more vent passageways is a plurality of the vent passageways, each of the vent passageways extending between a respective pair of the radial projections.

Aspect 15. The filter cartridge of any one of Aspects 1-14, wherein the filter cartridge includes at least three of the radial projections, and the bowl including at least three of the slots.

Aspect 16. A method of making a filter assembly for filtering liquid, comprising: inserting a filter cartridge into a bowl, the filter cartridge including radial projections and the bowl including slots disposed on an inner side of the bowl, wherein the inserting of the filter cartridge into the bowl includes: inserting each of the radial projections into a respective one of the slots of the bowl, the radial projections inserted in the slots preventing rotation of the filter cartridge relative to the bowl and preventing a bottom and a side of the filter cartridge from contacting the bowl; and affixing a cap to the bowl to form an enclosed space containing the filter cartridge, the cap including a fluid inlet port, a fluid outlet port, and a gas venting port, wherein the affixing of the cap to the bowl includes: affixing a lower circumferential surface of the cap to an upper circumferential surface of the bowl, Aspect 17. The method of Aspect 16, wherein the inserting of the radial projections into the slots of the bowl results in the filter cartridge hanging within the bowl by the radial projections.

Aspect 18. The method of any one of Aspects 16 and 17, wherein the lower circumferential surface of the cap and the upper circumferential surface of the bowl are affixed by being thermally fused together.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A filter assembly for filtering liquid, comprising:
a filter housing including a cap, a bowl, and an enclosed space, a lower circumferential surface of the cap affixed to an upper circumferential surface of the bowl to form the enclosed space, the cap including a fluid inlet port, a fluid outlet port, and a gas venting port for the enclosed space, and the bowl including slots disposed on an inner side of the bowl; and
a filter cartridge disposed in the enclosed space of the filter housing and fluidly connected to the fluid inlet port and the fluid outlet port in the cap, and the filter cartridge including radial projections disposed in the slots of the bowl blocking rotation of the filter cartridge relative to the bowl and preventing a bottom and a side of the filter cartridge from contacting the bowl, wherein:
the cap includes a first connection ridge that extends from a bottom of the cap and surrounds each of the fluid inlet port and the fluid outlet port in the cap;
the filter cartridge includes a top with a cartridge inlet, a cartridge outlet, and a second connection ridge that extends from the top of the filter cartridge and surrounds each of the cartridge inlet and the cartridge outlet in the filter cartridge, and the first connection ridge of the cap being affixed to the second connection ridge of the filter cartridge; and
the second connection ridge includes:
a first ridge portion that surrounds the cartridge inlet;
a second ridge portion that extends from the first ridge portion and surrounds the cartridge outlet; and
a third ridge portion and a fourth ridge portion, and each of the second ridge portion, the third ridge portion, and the fourth ridge portion extends outward from the first portion in a different radial direction.

2. The filter assembly of claim 1, wherein all contact between the cap and the bowl and between the cap and the filter cartridge is via corresponding mating surfaces of the cap, the bowl, and the filter cartridge.

3. The filter assembly of claim 1, wherein
a bottom of the cap is pressed against a top of the filter cartridge preventing vertical movement of the filter cartridge in the enclosed space, and
each of the radial projections is inserted into a respective one of the slots, each of the radial projections and the respective one of the slots have a same width that prevents circumferential movement of each of the radial projections within each of the slots.

4. The filter assembly of claim 1, wherein all contact between the filter cartridge and the bowl is via the radial projections and the slots.

5. The filter assembly of claim 1, wherein all contact between the filter cartridge and the cap is via the first connection ridge and the second connection ridge.

6. The filter assembly of claim 1, wherein the first connection ridge is affixed to the second connection ridge to form each of:
an intermediate inlet passageway that is a sealed fluid connection from the fluid inlet port of the cap to the cartridge inlet of the filter cartridge, and
an intermediate outlet passageway that is a sealed fluid connection from the cartridge outlet of the filter cartridge to the fluid outlet port of the cap.

7. The filter assembly of claim 1, wherein the filter cartridge has a cylindrical shape, the cartridge inlet and the fluid inlet port disposed along a vertical axis of the cylindrical shape of the filter cartridge.

8. The filter assembly of claim 1, wherein the first connection ridge and the second connection ridge have a same shape.

9. The filter assembly of claim 1, wherein the lower circumferential surface is spaced apart from the first connection ridge of the cap.

10. The filter assembly of claim 1, wherein the side of the filter cartridge is radially spaced apart from the inner side of the bowl by the radial projections to form one or more vent passageways configured to direct gas within the enclosed space to the gas venting port in the cap.

11. The filter assembly of claim 10, wherein the one or more vent passageways is a plurality of the vent passageways, each of the vent passageways extending between a respective pair of the radial projections.

12. The filter assembly of claim 1, wherein the filter cartridge includes at least three of the radial projections, and the bowl including at least three of the slots.

13. A method of making the filter assembly of claim 1 comprising:
inserting the filter cartridge into the bowl which includes inserting each of the radial projections into a respective one of the slots of the bowl; and
affixing the cap to the bowl which includes affixing the lower circumferential surface of the cap to the upper circumferential surface of the bowl.

14. The method of claim 13, wherein the lower circumferential surface of the cap and the upper circumferential surface of the bowl are affixed by being thermally fused together.

15. A filter assembly for filtering liquid, comprising:
a filter housing including a cap, a bowl, and an enclosed space, a lower circumferential surface of the cap affixed to an upper circumferential surface of the bowl to form the enclosed space, the cap including a fluid inlet port, a fluid outlet port, and a gas venting port for the enclosed space, and the bowl including slots disposed on an inner side of the bowl; and
a filter cartridge disposed in the enclosed space of the filter housing and fluidly connected to the fluid inlet port and the fluid outlet port in the cap, and the filter cartridge including radial projections disposed in the slots of the bowl blocking rotation of the filter cartridge relative to the bowl and preventing a bottom and a side of the filter cartridge from contacting the bowl, wherein
the cap includes a first connection ridge that extends from a bottom of the cap and surrounds each of the fluid inlet port and the fluid outlet port in the cap, and the filter cartridge includes a top with a cartridge inlet, a cartridge outlet, and a second connection ridge that extends upwardly from the top of the filter cartridge and surrounds each of the cartridge inlet and the cartridge outlet in the filter cartridge, and the first connection ridge of the cap being affixed to the second connection ridge of the filter cartridge.

16. The filter assembly of claim 15, wherein all contact between the filter cartridge and the cap is via the first connection ridge and the second connection ridge.

17. The filter assembly of claim 15, wherein the first connection ridge is affixed to the second connection ridge to form each of:

an intermediate inlet passageway that is a sealed fluid connection from the fluid inlet port of the cap to the cartridge inlet of the filter cartridge, and an intermediate outlet passageway that is a sealed fluid connection from the cartridge outlet of the filter cartridge to the fluid outlet port of the cap.

18. The filter assembly of claim 15, wherein the second connection ridge includes:

a first ridge portion that surrounds the cartridge inlet, and a second ridge portion that extends from the first ridge portion and surrounds the cartridge outlet.

19. The filter assembly of claim 15, wherein the side of the filter cartridge is radially spaced apart from the inner side of the bowl by the radial projections to form a plurality of vent passageways extending between a respective pair of the radial projections and configured to direct gas within the enclosed space to the gas venting port in the cap end.

20. A method of making the filter assembly of claim 15 comprising:

inserting the filter cartridge into the bowl which includes inserting each of the radial projections into a respective one of the slots of the bowl; and affixing the cap to the bowl which includes affixing the lower circumferential surface of the cap to the upper circumferential surface of the bowl.

* * * * *